United States Patent [19]

Kulp et al.

[11] 4,373,381
[45] Feb. 15, 1983

[54] MANHOLE LEAKAGE INDICATOR AND METHOD FOR USING

[76] Inventors: Leon Kulp, 426 Bridge St., Catasauqua, Pa. 18032; Donald E. Noggle, 102K Village Round, Wescosville, Pa. 18106

[21] Appl. No.: 229,337

[22] Filed: Jan. 29, 1981

[51] Int. Cl.³ .......................................... G01M 3/28
[52] U.S. Cl. ................................. 73/40.5 R; 73/49.5; 138/93
[58] Field of Search ............... 73/40.5 R, 49.6, 49.8; 138/90, 93

[56] References Cited

U.S. PATENT DOCUMENTS

| | | | |
|---|---|---|---|
| 539,568 | 5/1895 | Bride | 138/93 |
| 1,506,418 | 8/1924 | Evensta et al. | 138/93 X |
| 1,710,439 | 4/1929 | Taylor | 138/93 X |
| 3,431,945 | 3/1969 | Robillard | 138/90 |

FOREIGN PATENT DOCUMENTS 7030 of 1895 United Kingdom .................. 138/93

*Primary Examiner*—Edward R. Kazenske
*Assistant Examiner*—Joseph W. Roskos
*Attorney, Agent, or Firm*—Ruth Moyerman

[57] ABSTRACT

An apparatus and method are disclosed which are suitable for detecting leakage from manholes. The apparatus of the invention comprises a rim upon which an inflatable tube is mounted, a pressure gauge for measuring gas pressure, and a valve through which air or a similar gas may be introduced through the apparatus into the manhole is included. The apparatus may further include a duct which passes entirely through the assembly and which includes a chain or cable attached to the apparatus or the cap of the duct and the other end of which may be secured within the manhole itself. In the practice of the method of this invention, the apparatus is inserted into the manhole with the safety cable attached (if such is provided) and the tube portion of the apparatus is inflated to provide an airtight seal. The testing gas is introduced into the manhole to a predetermined pressure as measured on the gauge and, after a suitable time has elapsed, a second reading may be taken to determine any drop in pressure which may be attributable to leakage from the manhole.

5 Claims, 4 Drawing Figures

MANHOLE LEAKAGE INDICATOR AND METHOD FOR USING

BACKGROUND OF THE INVENTION

1. Field of the Invention

This invention relates to static structures, and more particularly to a manhole testing cover and method for its use in testing for leakage from a manhole.

2. Description of the Prior Art

Manholes form a part of a gravity sewer system. The manholes are formed from cylindrical sections of preformed concrete stacked one on the other from the sewer level up to ground level. The manhole allows access into the sewer. A single manhole may be anywhere from two feet to thirty feet in height and contains as many as ten individual sections. The manhole sections are presumably sealed together during construction to form a unit, and a seal is necessary to prevent ground water from seeping into the manhole, and also to prevent exfiltration from polluting the ground.

It is common for municipalities to require that the manholes be tested for leakage. The prior art manhole leakage test involves closing the main lines of the sewer by air bags, and thereafter filling the manhole with water under a head maintained two feet below the top of a manhole for a period of thirty minutes, after which period the drop in the water level is tested. If the drop in the water level exceeds, for example, a quarter of an inch, then the presumption is made that there is excess leakage from the manhole.

The use of water as a testing medium for manhole leakage has considerable disadvantages. The chief among these is that it can be remarkably difficult to locate a source of water sufficiently close to the manhole to be tested. Furthermore, following the testing of the manhole, it is necessary to pump the water back out of the manhole and dispose of it. Thus, what sounds like a very simple test to conduct under the circumstances normally encountered, becomes an expensive, time consuming and a tedious regimen.

There is therefore a need for an apparatus and a method for testing leakage from a manhole which is inexpensive to construct but accurate in results. The apparatus should also be simple to use. Lastly, the apparatus should negate the need for water as a testing medium.

SUMMARY OF THE INVENTION

The aforementioned prior art problems are solved by the manhole leakage indicator and method for testing leakage from manholes of this invention.

The apparatus of this invention comprises, in its preferred embodiment, a rim similar to a tire rim upon which an inflatable air bag is mounted. The apparatus further includes a bottom plate, also circular, which serves as a safety device and on which the rim and air bag rest. Valve means are provided to allow the inflation and deflation of the tube. Gas inlet means are also provided which extend through the assembly to allow a gas (preferably air) to be pumped into the manhole after the assembly is in place. Lastly, means are provided on the assembly to receive a standard gauge intended to measure the gas pressure exerted against the assembly during the testing procedure.

A second preferred embodiment includes a safety feature in which a duct extends longitudinally through the assembly. A cap is provided for the exterior side. The duct includes means such as a hook to enable a cable or chain to be secured to the assembly through the duct. The duct is preferably such a size as to permit someone to insert his hand therein to attach a cable or chain to the hook. The other end of the cable or chain is secured within the manhole, for example, on one of the ladder rungs conventionally appearing as a part of the manhole. Thus, when the assembly is in use, should an accident occur and the apparatus blow out of the manhole during the testing period, the chain will operate to restrain the device from being dangerously hurtled.

In the method of this invention, if the assembly includes the aforementioned safety feature, then as a first step the chain or cable is hooked within the manhole and also within the duct of the assembly, and the duct cap fastened on the duct. Next, the leakage indicator is inserted into the manhole. The air bag is then inflated (preferably but not necessarily with air) in the conventional manner with a conventional pump until the apparatus fits tightly in place. Air, or any other suitable gas such as nitrogen, is then pumped into the manhole to a predetermined pressure which may be measured on a gauge mounted on the assembly. A predetermined amount of time is allowed to pass and the gauge may then be read to ascertain the amount and rate of gas leakage from the manhole. Removal of the apparatus is achieved by normalizing the pressure within the manhole, deflating the tube, and removing the assembly.

It is therefore an object of this invention to provide an apparatus and a method for testing leakage from manholes.

It is another object of this invention to provide the aforementioned manhole leakage testing device as an easy to use, inexpensive to construct, and readily portable apparatus.

It is yet another object of this invention to provide a testing apparatus and method which eliminate the need for water as a component for testing of manholes.

These and other objects will be more readily ascertainable to one skilled in the art from a consideration of the following Figures and exemplary embodiments.

BRIEF DESCRIPTION OF THE DRAWING(S)

DETAILED DESCRIPTION OF THE PREFERRED EMBODIMENT(S)

Figure 1:
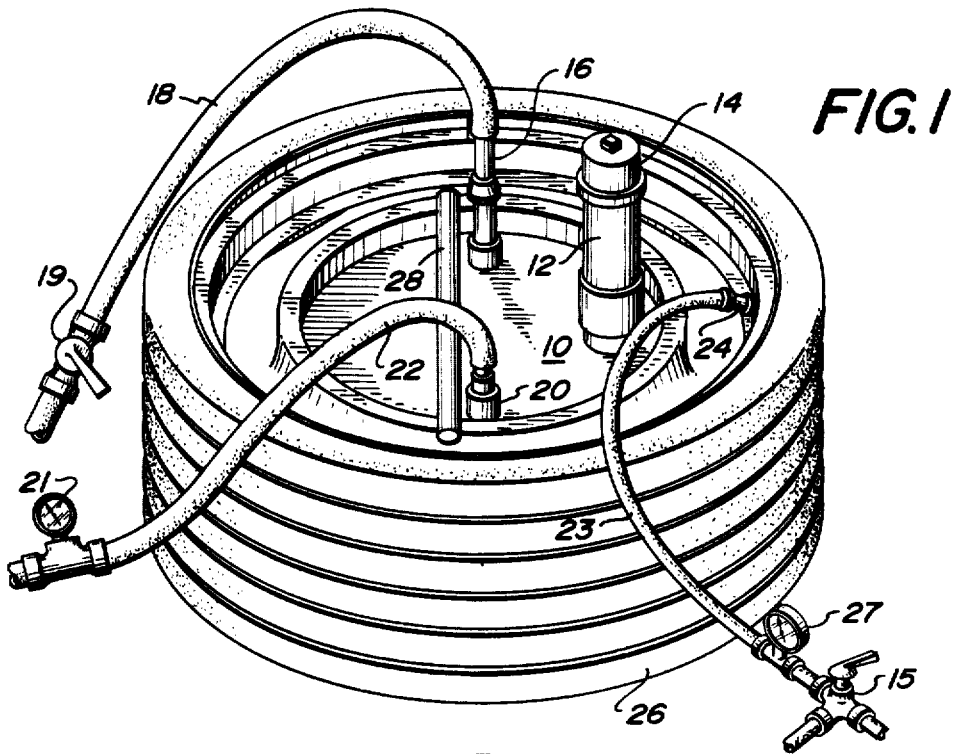
FIG. 1 shows an elevation of the preferred embodiment of this invention.

Referring now to the drawings, and more particularly to FIG. 1, an elevation of the preferred embodiment of the apparatus of this invention is shown including rim 10. Rim 10 is preferably made of steel or similar alloy and includes duct 12, an extension of which is visible in FIG. 1. Duct 12 is topped by cap 14 and the function of duct 12 will be explained in subsequent Figures.

Rim 10 also includes valve 24 to which hose 23 and gauge 27 are connected.

In the functioning of the apparatus, valve 15, also connected to air bag 26, is used to introduce air into air bag 26 as measured by gauge 27. A pressure of 50 psi has been found to be a generally satisfactory air pressure for most applications.

Fitting 16 shown attached to hose 18 (visible in fragmentary) is another component of rim 10. Air or other gas is introduced into the manhole through hose 18 via valve 19 through fitting 16.

Rim 10 also includes fitting 20 shown connected to hose 22 (visible also in fragmentary). Gauge 21 connected to hose 22 measures the pressure inside the manhole. A pressure of four psi is satisfactory for most applications.

Handle 28 is the final part of the assembly shown in FIG. 1. Handle 28, shown as a bar welded to the rim, in this view is very helpful in positioning and removing the apparatus.

Figure 2:
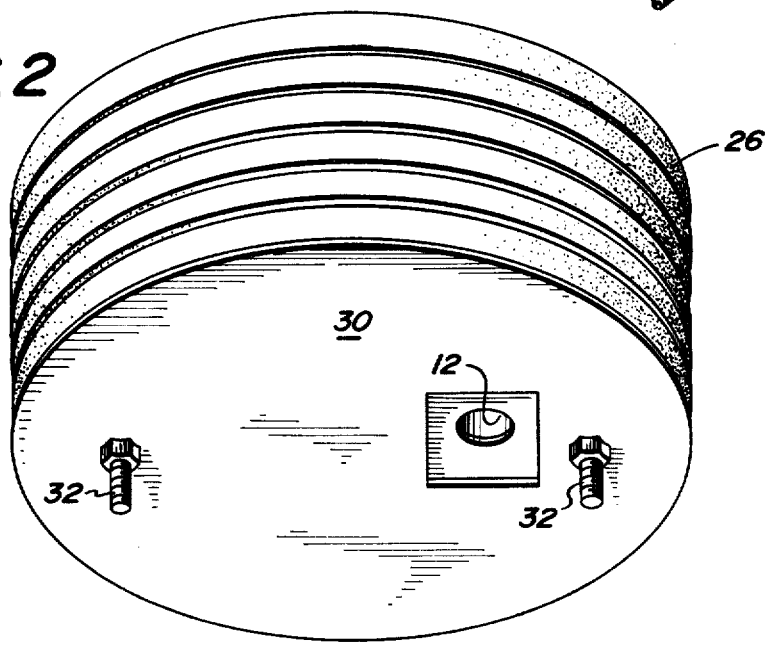
FIG. 2 shows a bottom elevation of the apparatus of FIG. 1.

Referring now to FIG. 2, a bottom elevation is shown of the apparatus as described in FIG. 1. Air bag 26 is shown resting on bottom plate 30. Bottom plate 30 is also preferably steel or similar construction. Bottom plate 30 operates as a safety feature in that when air bag 26 is inflated and the manhole is likewise pressurized, there might be a tendency for air bag 26 to roll out of rim 10 and be expelled from the manhole. Including bottom plate 30 as part of the apparatus prevents this mishap.

The interior of duct 12 is somewhat visible in FIG. 2 and shows clearly that the duct passes all the way through the rim and bottom plate to give access to the manhole. Bottom plate 30 is connected to rim 10 by bolts and nuts 32.

Figure 3:
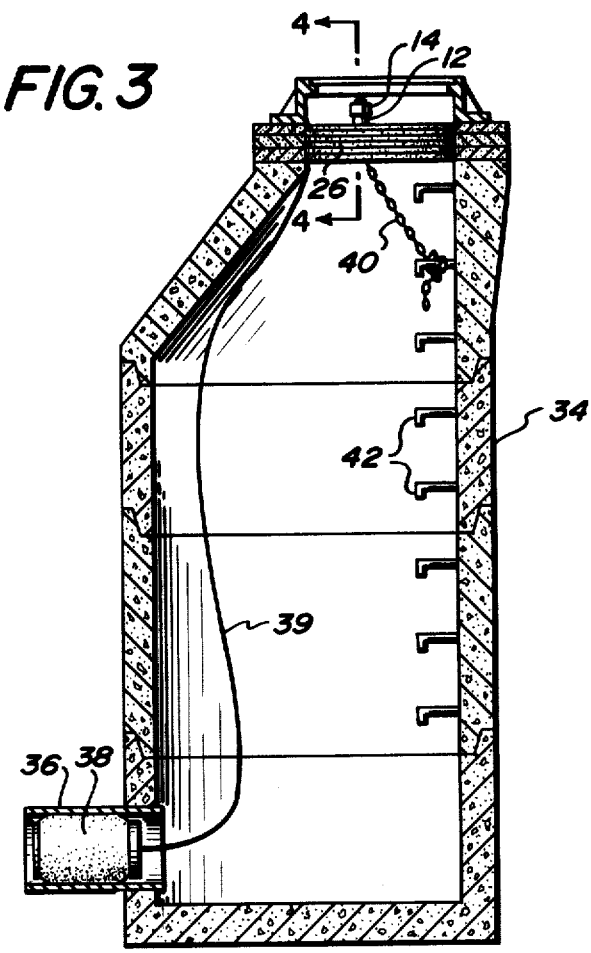
FIG. 3 illustrates a cross section of a manhole with the apparatus of this application in place.

Referring now to FIG. 3, a cross section of a typical manhole 34 is shown including main line 36. In the testing of manholes, both conventionally and in this invention, the main line 36 must first be sealed with air bags 38 commonly called sewer plugs. An example of an appropriate air bag is believed to be currently manufactured by United Survey, Inc. of Cleveland, Ohio or Churne Corporation of Edina, Minnesota. Such an air bag is described in U.S. Pat. No. 3,902,528. The uninflated air bag or plug is inserted in the manhole and then filled with air by a pump through hose 39 after which the hose is either allowed to drop into the manhole or is looped over a hanger on the manhole wall. At the completion of the test, the plug is deflated by manually opening a valve on the plug.

After air bag 38 is installed in each of the main lines of manhole 34 and properly inflated, the apparatus of this invention is inserted into the manhole to replace the normal manhole cover. In the view shown in FIG. 3, air bag 26 is plainly visible in this connection.

Figure 4:
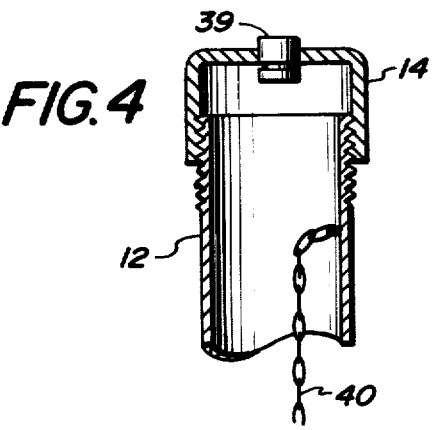
FIG. 4 shows an enlargement of a cross section taken on lines 4—4 of FIG. 3.

The apparatus of this invention preferably contains a second safety feature visible in FIG. 3 and more particularly in FIG. 4. Referring simultaneously to FIGS. 3 and 4, the latter being a cross section taken on line 3 of FIG. 3, the interior of duct 12 may be seen. In FIG. 4, chain 40 may be seen attached to a wall of duct 12. To attach chain 40, cap 14 may be removed and chain 40 attached by hand. Chain 40 extends all the way through the apparatus and is of sufficient length so that its other end may be connected somewhere within manhole 34, preferably on rung 42.

In the method of this invention, the conventional manhole cover is removed and chain 40 is attached to an appropriate plate within the manhole. The apparatus is then firmly secured within the manhole and air bag 26 inflated to give an airtight seal. Gas is pumped into the manhole to the predetermined pressure as measured on the aforementioned gauge. A predetermined time is allowed to pass before a second reading is made. The differential in readings is used to determine the pressure drop over the interval and which pressure drop may be attributed to escaping gas. At the end of the test, air bag 26 is deflated, the apparatus is removed including unhooking the chain, and air bags 38 are deflated and removed in the conventional manner.

There are many variations which may be practiced within the scope of this invention.

For example, handle 28, while illustrated as a grip shaft, is not meant to be a limitation and any handle means which works satisfactorily may be substituted (or the handle may be eliminated altogether).

Although gas inlet and outlet are shown separately, fittings 16 and 20 may be combined if such would be desired.

The configuration and placement of duct 12 is optional.

The overall circular configuration of the assembly is circular because manholes are generally circular, but the apparatus may be adapted to fit such opening dimensions as are required.

Having now described and illustrated my invention, it is not intended that such description limit the scope of this invention, but rather that this invention be limited only by reasonable interpretation of the apended claims.

What is claimed is:

1. An apparatus for testing leakage from manholes comprising:
   (a) a generally circular rim of rigid construction
   (b) an inflatable bag circumscribing said rim, said rim and bag resting on
   (c) a generally circular bottom plate to form an assembly, said assembly having a radius of somewhat less than the manhole to be tested;
   (d) gas inlet means connected to said bag to allow its inflation and deflation;
   (e) gas inlet means extending longitudinally through said assembly to allow the introduction of a gas into said manhole after said assembly is in place;
   (f) means associated with said assembly adapted to receive a gauge intended to measure gas pressure of the manhole;
   (g) a duct extending longitudinally through said assembly from the rim side to the bottom plate side;
   (h) cap means for said duct at the rim side; and,
   (i) means within said duct for releasably securing a cable to a wall of said duct whereby a cable may be secured at one end to said assembly and at its other end to a wall of said manhole.

2. The apparatus according to claim 1 wherein said means of step (i) is a hook.

3. The apparatus according to claim 1 wherein said rim and bottom plate are constructed of steel.

4. A method of testing for leakage in manholes comprising:
   (a) introducing into a manhole top an apparatus, said apparatus comprising:
   (a') a generally circular rim of rigid construction;
      (b') an inflatable bag circumscribing said rim, said rim and bag resting on
      (c') a generally circular bottom plate to form an assembly, said assembly having a radius of somewhat less than the manhole to be tested;
      (d') gas inlet means connected to said bag to allow its inflation and deflation;

(e') gas inlet means extending longitudinally through said assembly to allow the introduction of a gas into said manhole after said assembly is in place;

(f') means on said assembly adapted to receive a gauge intended to measure gas pressure;

(g') a duct extending longitudinally through said assembly from the rim side to the bottom plate side;

(h') cap means for said duct at the rim side;

(i') means within said duct for releasably securing a cable to a wall of said duct whereby a cable may be secured at one end to said assembly and at its other end to a wall of said manhole; and, (j') said cable having one end of which is releasably attached to said duct wall;

(b) releasably attaching said cable other end to said wall of the manhole;

(c) inserting said apparatus into said manhole top;

(d) introducing gas into said bag to seal said apparatus against the edge of said manhole;

(e) introducing gas into said manhole through said longitudinal gas inlet means to a predetermined pressure; and, (f) measuring said pressure initially and again subsequently to ascertain the amount of loss by leakage of said gas in said manhole.

5. The method of claim 4 wherein said gas is air.

* * * * *